No. 842,727. PATENTED JAN. 29, 1907.
S. H. TUCKER.
COTTON CHOPPING MACHINE.
APPLICATION FILED MAR. 31, 1906.
3 SHEETS—SHEET 1.
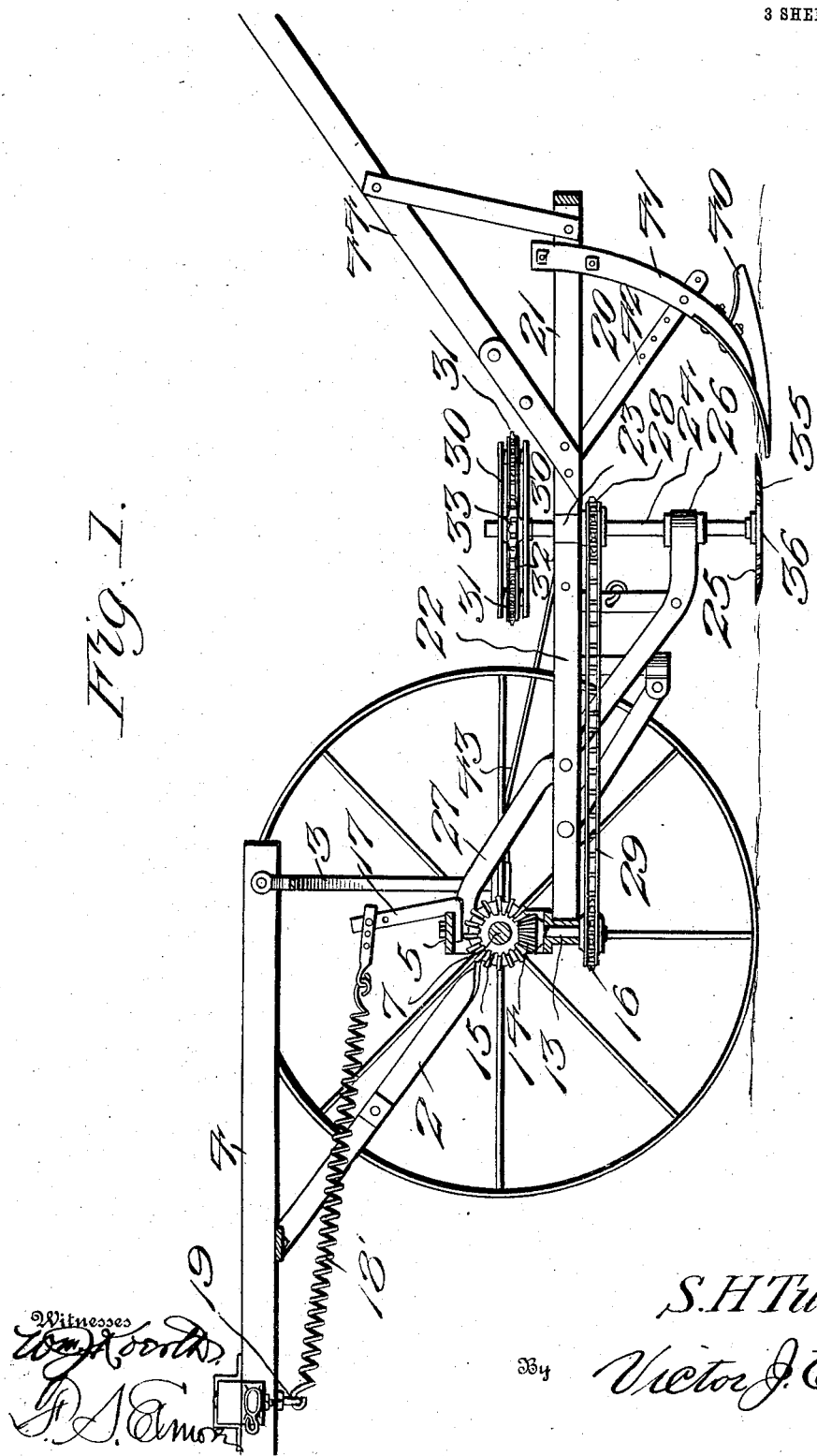
Witnesses
Inventor
S. H. Tucker;
By Victor J. Evans
Attorney No. 842,727. PATENTED JAN. 29, 1907.
S. H. TUCKER.
COTTON CHOPPING MACHINE.
APPLICATION FILED MAR. 31, 1906.
3 SHEETS—SHEET 2.
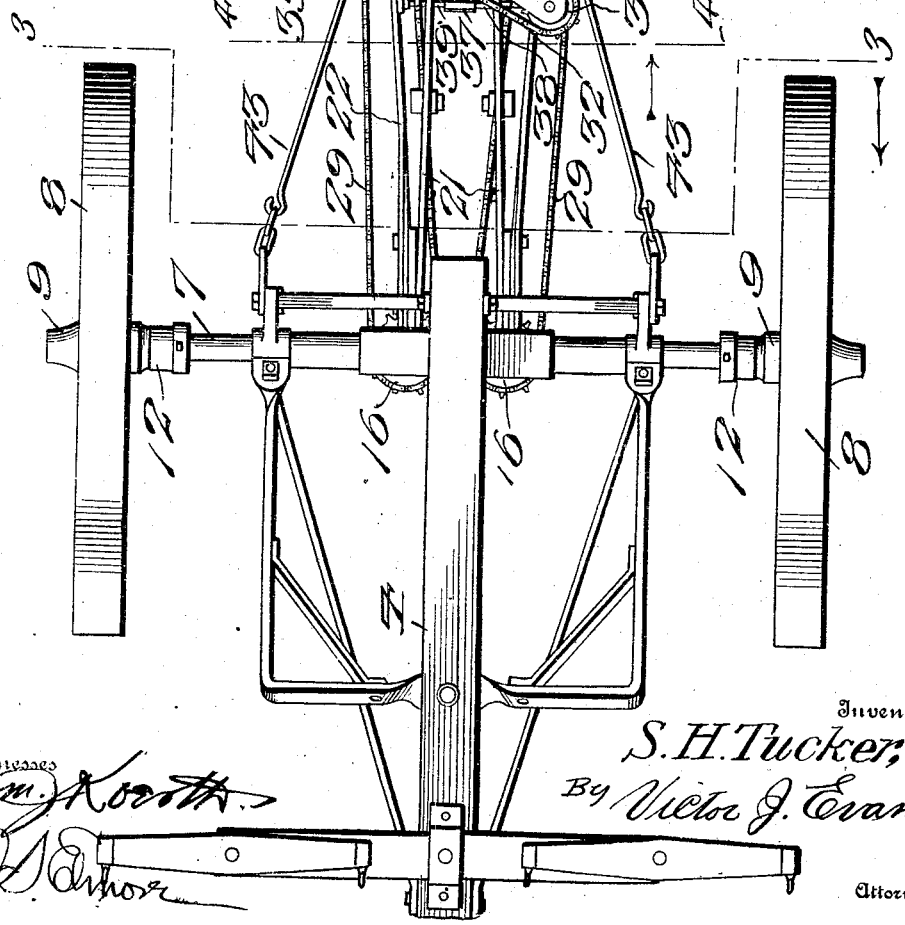
Witnesses
Inventor
S. H. Tucker,
By Victor J. Evans
Attorney

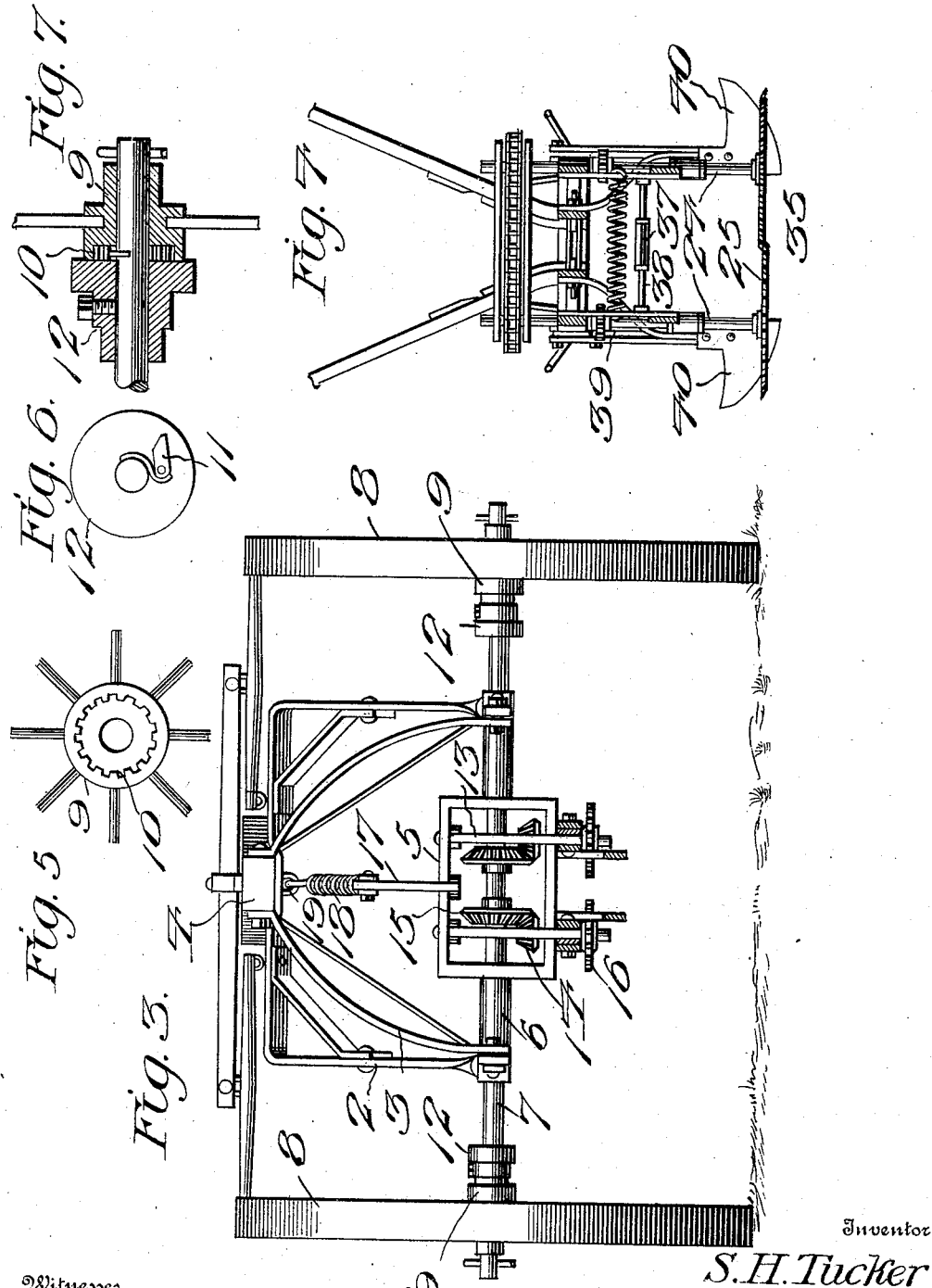

UNITED STATES PATENT OFFICE.

SAMUEL HOUSTON TUCKER, OF GATESVILLE, TEXAS.

COTTON-CHOPPING MACHINE.

No. 842,727.        Specification of Letters Patent.        Patented Jan. 29, 1907.

Application filed March 31, 1906. Serial No. 309,170.

*To all whom it may concern:*

Be it known that I, SAMUEL HOUSTON TUCKER, a citizen of the United States, residing at Gatesville, in the county of Coryell and State of Texas, have invented new and useful Improvements in Cotton-Chopping Machines, of which the following is a specification.

This invention relates to cotton-chopping machines of the type employed for thinning cotton-plants, and has for its objects to produce a comparatively simple inexpensive device of this character in which the blades will act yieldably upon and for cutting the surplus plants, one wherein the blades may move freely in a horizontal plane to conform to surface irregularities, and one in which the blades will revolve in close proximity to each other, thus positively cutting and destroying the plants acted upon.

A further object of the invention is to provide a device of this character in which the blades may be positively and accurately adjusted away from each other to accord with the size of the stalks to be cut, one in which the plants which remain standing in the rows will be uniformly spaced, and one whereby the cotton will be properly cultivated simultaneously with the thinning operation.

With these and other objects in view the invention comprises the novel features of construction and combination of parts more fully hereinafter described.

In the accompanying drawings, Figure 1 is a side elevation, partly in section, of a machine embodying the invention. Fig. 2 is a top plan view of the same. Fig. 3 is a vertical transverse section taken on the line 3 3 of Fig. 2. Fig. 4 is a detail sectional view taken on the line 4 4 of Fig. 2. Figs. 5, 6, and 7 are detail views of the clutches.

Referring to the drawings, 1 designates the main frame of the machine, including arch members 2 and 3, to which is bolted a tongue 4, there being connected in the frame a vertically-disposed rectangular yoke 5, having tubular bearings 6 mounted for rotation upon a shaft or axle 7, in turn journaled in the frame and provided with transporting wheels 8, the hubs 9 of which are provided with ratchet-teeth 10, adapted for engagement by spring-pawls 11, pivoted to clutch-heads 12, fixed upon the axle and serving through engagement with the teeth 10 to fix the wheels 8 for rotation in one direction with the axle.

Journaled in suitable bearings in the yoke 5 is a pair of vertical stub-shafts 13, having beveled pinions 14, in mesh with gears 15, fixed upon the shaft 7, there being fixed upon the lower ends of the shafts 13 sprocket-pinions 16, while attached to and projecting upwardly from the yoke 5 is an arm 17, to which is connected one end of a normally expanded lifting-spring 18, the other end of which is detachably engaged by an eyebolt 19 with the tongue 4.

Extending rearwardly from the main frame is an auxiliary cutter-frame 20, comprising side bars 21, pivoted at their forward ends, respectively, upon the lower ends of the shafts 13 to swing in a horizontal plane, there being bolted to the forward ends of the bars 21 rearwardly-extending spring members or arms 22, provided intermediate their ends with bearing 23, in which are journaled for rotation vertical cutter-shafts 24, equipped at their lower ends with cutting-blades 25, the shafts being further sustained in bearings 26, provided at the rear ends of downwardly and rearwardly inclined frame members or bars 27, pivoted at their forward ends to the upper side portion of the yoke 5 and bolted at points between their ends to the side bars 22, while fixed upon the shafts 24 are sprocket-wheels 28, connected by sprocket chains or belts 29 with the sprocket-wheels 16 on the shafts 13, whereby the latter, which are driven from the axle 7, impart motion to the cutter-shafts 24.

Sustained above the frame 20 by the shafts 24 is a pair of vertically-spaced triangular-shaped plates 30, between which are idly mounted for rotation a pair of sprocket-pinions 31, disposed, respectively, at opposite corners of the plates and adapted to receive a sprocket chain or belt 32, which passes around sprocket pinions 33, fixed upon the shafts 24, one of which latter is disposed centrally between the pinions 31 and adapted for movement in slots 34 in the plates toward and from the other shaft 24, the belt 32 being so arranged around the sprocket-pinions as to impart reverse rotation to the cutter-shafts.

The blades 25, the edges of which slightly overlap, are preferably in the form of sheet-metal disks, and each has formed upon its sharpened cutting edge or periphery cutting teeth or serrations 35 and a pair of diametrically-opposed notches or recesses 36, adapted to register during the rotation of the blades, thus to present between the latter when in action openings or seats for the reception of the plants which are to remain standing and which are technically known as the "stand," the system of gearing being such that the shafts 24 will be driven at a relatively uniform rate of speed and the blades revolve toward each other and rearwardly, whereby the material passing between and being cut by the blades will be fed rearwardly from the latter.

The shafts 24 may be adjusted for moving the blades 25 toward each other by means of an adjusting member or turnbuckle 37, connecting the sections of a rod or element 38, extended transversely between and terminally engaged with the spring-arms 22, there being also disposed between said arms a normally expanded tension-spring 39, which acts upon the arms 22 for holding the blades yieldably to their work, while arranged in rear of and to follow the cutting-blades 25 are cultivating-blades or colters 40, attached to the lower ends of standards 41, mounted at their upper ends upon the side bars 21 and for adjustment longitudinally of the frame 20, the standards being adjustably connected by braces 42 with the frame, whereby their inclination may be varied to control the depth of entrance of the colters 40 into the ground.

The spring-arms 22 are properly strengthened by bracing-rods 43, connected at their forward ends with the rear ends of the frame members 2, while attached to the auxiliary frame 20 is a pair of upwardly and rearwardly inclined handle-bars 44, by which the frame may be moved laterally for causing the blades 25 to properly follow the rows of plants being acted upon.

In practice as the machine advances over the ground motion will be transmitted from the axle 7 to the stub-shafts 13 through the medium of the gears 15 and pinions 14 and in turn transmitted from said shafts to the cutter-shaft 24 by means of the chains 29 for operating the cutting-blades 25. As the blades revolve the plants passing therebetween will be cut close to the ground by means of the teeth 35, it being understood, however, that the recesses 36 in the blades will come into register at regular intervals to form openings for the reception of certain plants which are to remain standing and that these plants will be spaced uniform distances apart, as heretofore explained and as will be readily understood. It is to be observed in this connection that the blades will be held yieldingly to their work by the spring 39 and that the auxiliary frame 20 may move in a vertical plane for permitting the cutting-blades to conform to surface irregularities, owing to the yoke 5 being journaled on the axle 7, and, furthermore, that the frame may move horizontally, causing the blades to properly follow the row of plants owing to the bars 21 being journaled at their forward ends upon the shafts 13. The movement of the frame 20 in a vertical plane is facilitated by the spring 18, which tends to lift the rear end of and consequently balances the frame.

From the foregoing it is apparent that I produce a simple device admirably adapted for the attainment of the ends in view, it being understood that in attaining these ends minor changes in the details herein set forth may be resorted to without departing from the spirit of the invention.

Having thus described my invention, what I claim is—

1. In a device of the class described, a main frame including an axle, a cutter-frame connected with the main frame and comprising a pair of yieldable arms movable horizontally toward and from each other and having bearings, cutter-shafts in said bearings and provided with cutter-blades, a spring connected for moving the bars toward each other, means for positively moving the bars away from each other, and means for operating the cutter-shafts from the axle.

2. In a device of the class described, a main frame including an axle, a cutter-frame connected with main frame and comprising a pair of yieldable arms movable toward and from each other and having bearings, cutter-shafts journaled in said bearings and equipped with cutter-blades, connections between the axle and cutter-shafts for operating the latter, a spring connected between and for moving the bars toward each other, and a sectional rod extended between the bars and including a turnbuckle operable for moving the bars away from each other.

3. In a device of the class described, a main frame including an axle, a cutter-frame connected with the main frame, a pair of cutter-shafts journaled in the cutter-frame and equipped with cutting-blades, a pair of vertically-spaced bearing-plates sustained by the cutter-shafts, sprocket-pinions fixed upon the shafts between the plates, a pair of sprocket-pinions mounted idly between the plates in line with and respectively at opposite sides of one of the first-named pinions, a chain arranged upon the pinions for connecting the shafts for reverse rotation one from the other, and connections between the axle and cutter-shafts for operating the latter.

4. In a device of the class described, a main frame including an axle and a bearing-yoke journaled thereon, a pair of vertical stub-shafts journaled in said yoke and geared to the axle for rotation therefrom, a cutter-frame connected for movement with the yoke, a lifting-spring arranged to turn the yoke upon the axle for swinging the cutter-frame vertically, a pair of cutter-shafts journaled in the cutter-frame and equipped with coöperating cutting-blades, and gearing between the stub-shafts and cutter-shafts for rotating the latter.

In testimony whereof I affix my signature in presence of two witnesses.

SAMUEL HOUSTON TUCKER.

Witnesses:
O. F. WELLS,
J. C. DUNBAUGH.